United States Patent [19] [11] 3,836,057
MacManus [45] Sept. 17, 1974

[54] APPARATUS FOR USE IN DEPOSITING AERATED FOOD PRODUCTS

[76] Inventor: John MacManus, 14-16 Twenty Second Rd., Whitestone, N.Y. 11357

[22] Filed: Mar. 14, 1973

[21] Appl. No.: 341,290

[30] Foreign Application Priority Data
Mar. 14, 1972 Great Britain.................... 11887/72

[52] U.S. Cl.......................... 222/529, 222/79, 251/9
[51] Int. Cl............................................... B67d 5/08
[58] Field of Search ....... 222/75, 212, 529, 79, 213, 222/214; 251/9, 6, 7, 8, 10

[56] References Cited
UNITED STATES PATENTS
2,804,993  9/1957  Davis et al............................ 222/75
3,632,021  1/1972  MacManus ........................... 222/95
3,638,681  2/1972  Moore ................................ 251/9 X Primary Examiner—Stanley H. Tollberg
Assistant Examiner—Larry H. Martin
Attorney, Agent, or Firm—Morsbach, Pillote & Muir

[57] ABSTRACT

A dispensing device is coupled to a flexible hose which is connected directly to the outlet of a whipping machine. The device includes a spear for use in filling closed cakes and containers with aerated food product, such as whipped cream. A pair of jaws is mounted on the device for nipping the hose between them and positively interrupting the flow from the hose into the spear. A switch is mounted on the device to start the pump motor when the jaws are opened, and stop it when the jaws are closed.

5 Claims, 5 Drawing Figures

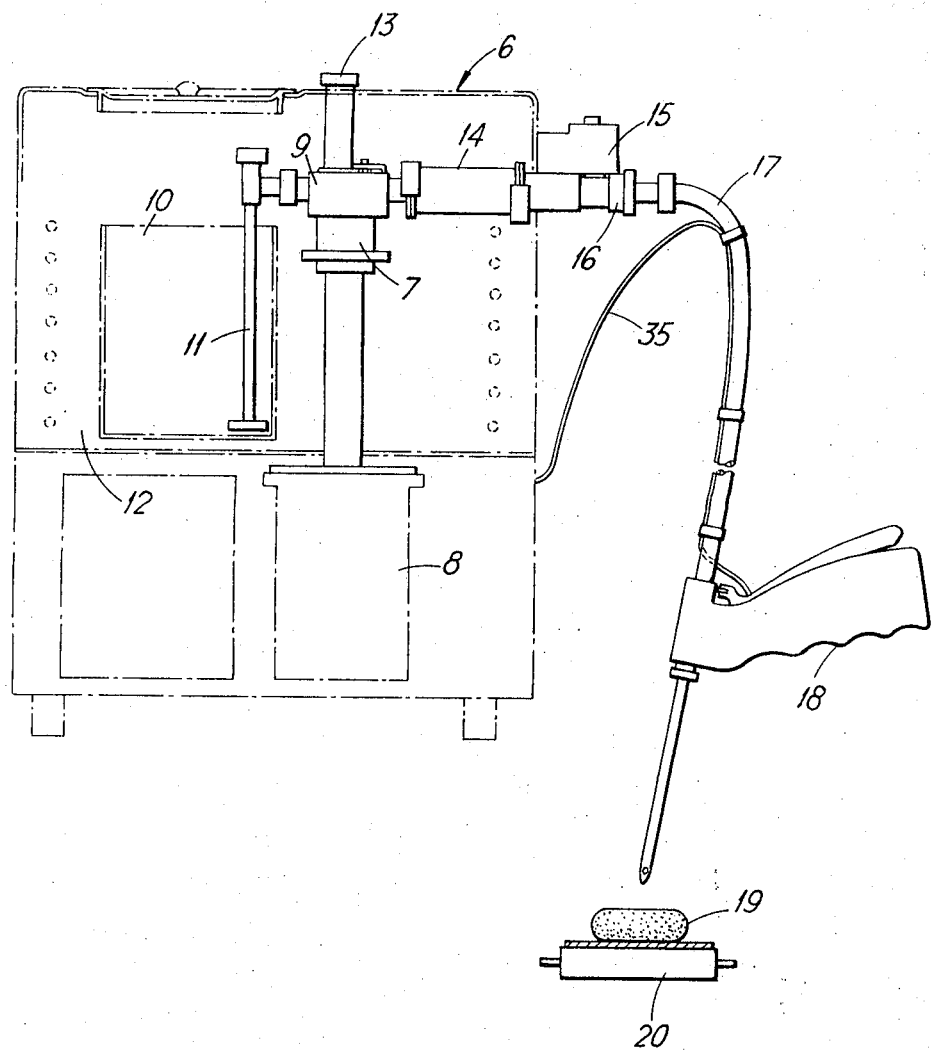

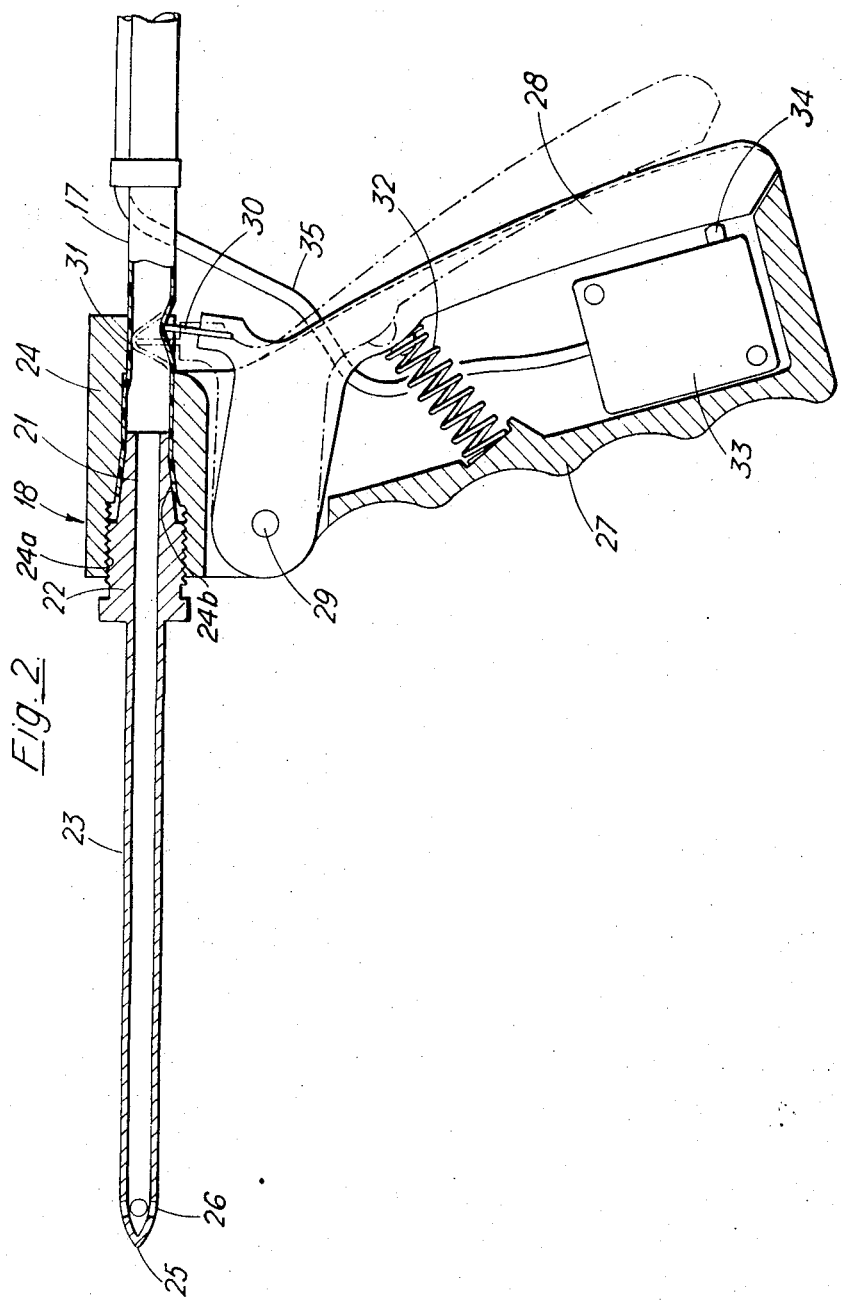

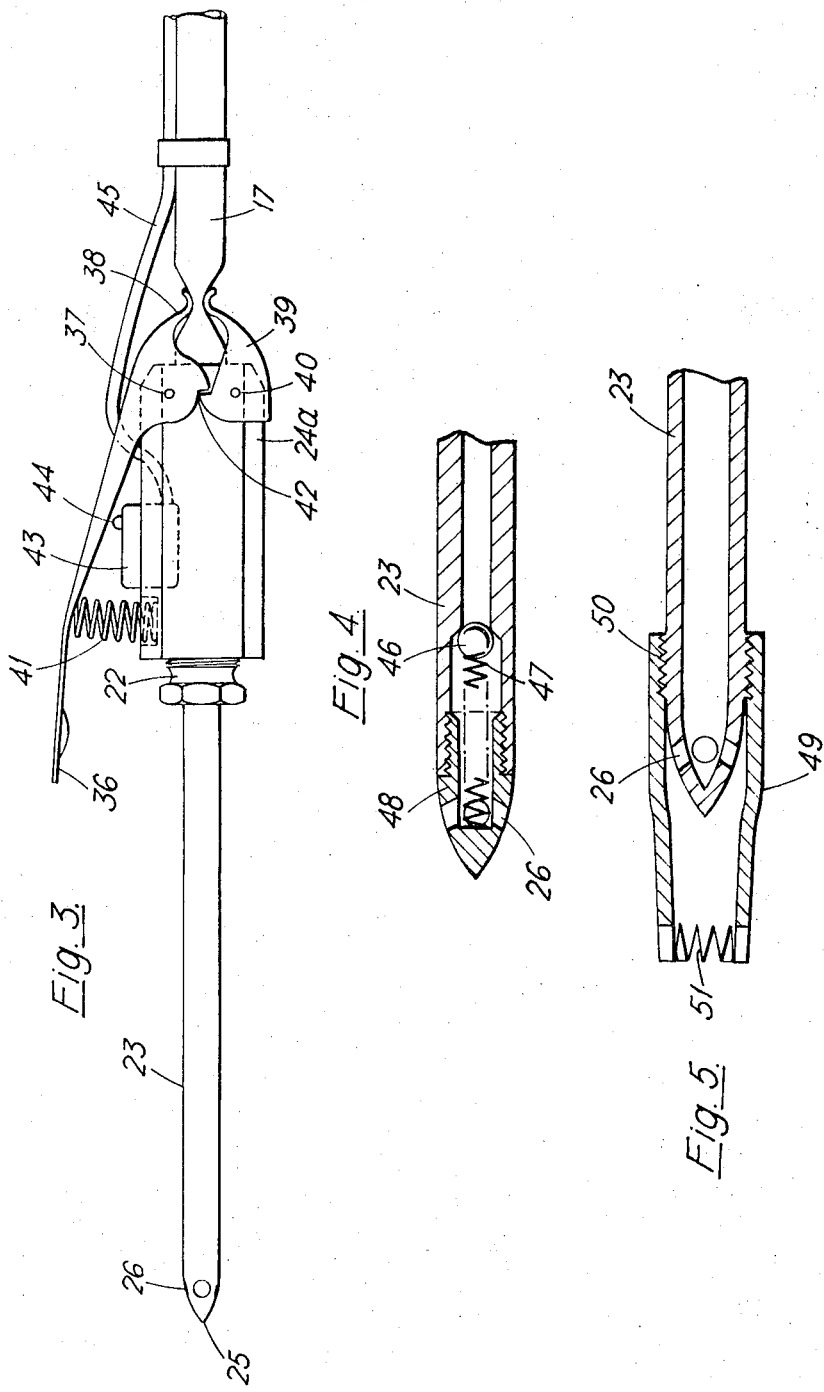

APPARATUS FOR USE IN DEPOSITING AERATED FOOD PRODUCTS

In my U.S. Pat. No. 3,632,021 I disclose a technique for use in filling containers or closed cakes, such as choux buns, puffs, eclairs, and doughnuts, with stiff fluent aerated food products, such as whipped cream. That technique involves using a whipping machine of the kind described for example in my U.S. Pat. No. 3,606,266 and which has a pump connected both to an air intake and through a suction tube to an unpressurised liquid product container whereby in use liquid product and air are simultaneously drawn into the pump, the pump having an outlet connected to an inlet of a static homogenizer. The whipped product after leaving the homogenizer is fed directly under pressure from the homogenizer through a flexible hose to a hollow dispensing spear or multiple spears which can be inserted into containers or closed cakes and which has at its downstream end a valve which opens against a resilient loading when an aerated product is forced by the pump through the spear or spears. In use the individual tip or combinations of the spears is inserted into the single or multiple containers or closed cake or multiples of them, the pump motor is started and a whipped product is dispensed through the spear, the pressure of the whipped product opening the non-return valve at the tip of the spear. When the pump motor is stopped the dispensing ceases and the valve recloses.

This new technique and the corresponding equipment has proved to be extremely efficient and satisfies a long need in the bakery and confectionery industry for a simple means of depositing inside a closed cake a predetermined portion of aerated whipped cream. There is however a possibility of further improvement. This relates to the fact that although the spring loaded valve at the tip of the spear closes at the end of a dispensing operation, to prevent the whipped product from oozing from the tip of the spear and to maintain the product under pressure in the spear, hose and machine downstream of the valve at the exit of the homogenizer, there must be a finite difference in pressure between that produced by the pump and that necessary to overcome the resilient loading of the spear probe valve. It follows that at the end of a dispensing operation the valve does not close immediately when the pump stops, but only after the pressure in the highly aerated product between the valve at the exit of the homogenizer and the probe exit end has reduced and equalized itself to a value at which it will be overcome by the resistant resilient spring loaded valve. While this equalization takes place the probe end valve will still be at least partly open and at times, depending on the amount of air and its expansion in the product and also the type of product being processed, will continue to be dispensed or slightly ooze slowly from the tip, and thus upon entry of the spear into the next product the oozing product leaves an unsightly blob of cream on the outside end of e.g. the eclairs or other products being successively processed. This also introduces a delay in the completion of each dispensing cycle and these delays add up to an appreciable time over an operator's working day. A further consideration is that the pressure of the highly aerated product between the valve at the exit of the homogenizer and the spear valve continually varies from dispensing cycle to dispensing cycle between a high value when the pump is operating and the pressure is sufficient to open the spear valve, and a lower value when the pump has stopped and the pressure has been reduced and equalized to a value at which the valve can close under its spring resilient loading. If only a small portion is to be deposited in each cycle through a hose of from 10 inches to 40 inches long into each closed cake, or in multiple groups, the size of the portion may be only a fraction of the volume of product directly contained between the valve at the homogenizer exit and the spear valve, consequently the product in passing through the hose to the tip of the spear may have its pressure raised and lowered a considerable number of times. This variation in the pressure of the product is deleterious to the quality of the product and promotes the separation of the air and cream leading to air pockets in the product and consequent lack of homogeneity of the product.

I have considered and proved that the solution to this difficult problem would be the incorporation at the spear entry end where the hose discharges aerated product into the spear of a positive shut-off valve which instantly interrupts the flow of product when the machine pump motor stops and consequently maintains the product between the valve at the homogenizer exit and spear at the desired pressure. Any reduction and equalization of the product pressure at the end of the dispensing cycle would then only have to take into account the small volume of product within the spear probe itself downstream of the positive shut-off valve. It should be noted that a shut-off valve such as a gate valve incorporating internal moving parts which contact the product is less satisfactory because of the extra work involved in cleaning these parts to maintain the necessary hygienic conditions.

In accordance with the present invention therefore an improved hose and spear for use in carrying out the technique described above incorporates a pair of jaws which are mounted on the spear and are relatively movable between an open position in which they do not impede the flow of product through the hose into the spear and a closed position in which they nip the hose between them and compress the internal walls of the hose together positively to interrupt the flow of product into the spear.

With this arrangement the interior of the hose can be quickly isolated from the interior of the spear probe when the pump is stopped at the end of a dispensing cycle so that the product in the flow path between the valve at the homogenizer exit and the portion of the hose which is clamped by the jaws, is retained under the proper working pressure. Since the jaws act externally on the flexible hose there are no additional parts with which the product may come into contact. Also importantly, the small diameter thin walled hose has sufficient length and extensibility to swell and this fact permits the jaws to push the material backward in the direction of the machine and thereby takes a certain amount of pressure off the product within the spear. Thus no spitting or spluttering occurs at the tip of the probe.

The spear will normally be held by an operator in his hand and manipulated manually into and out of closed cakes and containers, the freedom to manipulate the spear probe being provided by the flexibility of the hose. The jaws may be electrically controlled or also be arranged to be operated manually by the operator's hand which manipulates the probe. For this purpose an actuating member may be provided, movement of which controls the opening and closing of the jaws. At least one of the jaws may be pivotally connected to the spear about a transverse axis and fixed to the actuating member. Depression of this actuating member will cause the corresponding jaw to swing away from the hose and from the other jaw to the open position. A spring is preferably provided to urge that jaw or the jaws to assume the closed position which they will adopt when the actuating member is released again. The other jaw may be fixed or pivoted to the spear body and in the latter case an interconnection, such as a projection on one jaw and a mating recess on the other jaw inwardly of their pivotal connections, may be provided for causing the two jaws to swing synchronously between the open and closed positions.

The biting parts of the jaws which come together to nip the hose between them may have opposed convex faces curved in the longitudinal direction of the hose. In this way as the jaws come together the convex biting surfaces roll into the hose and neatly squeeze the product backward from a position where the hose is to be nipped together.

The hollow spear probe body may be screw-threaded and have a nut which screws onto or into the upstream end of the spear proper to trap the end of the hose between annular surfaces of the body and nut and seal the hose and the spear body together. The jaws may then be mounted on the nut. In some cases it may be desirable additionally as before to provide a resiliently loaded valve at the downstream end of the spear, the valve opening under the pressure of aerated product forced through the spear.

In order to avoid the need for a separate manual or foot control to ensure that the machine pump motor switches off substantially simultaneously with closing of the jaws and is switched on substantially simultaneously with opening of the jaws, the pump motor may be controlled by the manual or electrical control which operates the jaws. For example movement of the actuating member to open the jaws may simultaneously operate a micro-switch mounted on the spear probe body and connected to the electrical motor for the pump through a flexible cable extending along the hose to the whipping machine. This eliminates the need for the operator to have to concentrate on opening the jaws simultaneously with starting the whipping pump motor by means of a separate foot or hand control.

The spear may be used for deposit-decorating of confectionery by fitting over the downstream tip of the spear with a tubular hood which screws onto the body of the spear over the tip. The hood terminates in a conventional tubular nozzle into which the cream or other material is discharged from the tip of the spear, and from which the cream is extruded as a stream of star-shaped section. The hood is readily removable again from the spear if the spear is to be used for its normal function of injecting cream into a confection.

Some examples of equipment constructed in accordance with the present invention are illustrated in the accompanying drawings, in which:

FIG. 1 is an elevation of a machine to which a hose and spear are connected;

FIG. 2 is a section through the hose and spear assembly of FIG. 1;

FIG. 3 is a side elevation of a second hose and spear assembly;

FIG. 4 is a sectional detail of a modified spear tip; and,

FIG. 5 is a view similar to FIG. 4 but of a further modification.

The equipment illustrated in FIG. 1 incorporates a machine 6 identical to that described in detail in my U.S. Pat. No. 3,606,266. The machine has a pump 7 driven by a motor 8, the pump drawing in liquid product through an inlet 9 either from a container 10 via a pipe 11 in a refrigerated compartment 12, or from a remote bulk container through a flexible pipe. Simultaneously with the sucking in of the liquid product, the pump 7 sucks in air through an adjustable valve controlled by a rotatable plug 13 and the mixture of liquid product and air is pumped through a homogenizer 14 containing a series of static discs which provide a labyrinth of channels. The mixture is whipped into an emulsion by the homogenizer and passes through a solenoid operated shut-off valve 15 to the machine outlet and hence through a coupling 16 to a flexible hose 17.

The hose 17 is formed from a translucent synthetic plastic material of suitable hygienic characteristics.

The hose will normally be between 1 and 4 feet long and a number of hoses may be fed through an adaptor from a common machine as described in my earlier specifications.

The downstream end of the hose 17 is coupled to a dispensing device 18 through which the whipped cream or other aerated high overrun product may be deposited on or into a confection such as a closed cake 19 on a conveyor 20.

As shown in FIG. 2 the hose 17 is fitted over a tapered spigot 21 forming part of an integral enlargement 22 at the upstream end of the spear proper 23. A hollow body 24 has an internally threaded portion 24a which screws onto the enlargement 22 and a complementary annular tapering surface 24b which is drawn up to compress the end of the hose 17 between itself and the spigot 21 thus sealing the hose 17 to the spear body 23. The spear 23, which is made of stainless steel or other hygienic material, terminates in a pointed tip 25 formed with a ring of laterally directed outlet apertures 26.

In the FIG. 2 example the dispensing device 18 is formed as a gun, the nut 24 being formed integrally with an operating handle 27 to which an actuating member trigger 28 is pivoted at 29. The trigger 28 has fixed to it a bar 30 forming a movable jaw which cooperates with a surface 31 of the nut 24, forming the complementary fixed jaw. A compression spring 32 within the handle 27 urges the trigger 28 to the outer position shown in phantom in FIG. 2, in which the jaws 30 and 31 nip the hose 17 between them and cut off flow of product through the hose 17 and spear body 23. The jaws are opened simply by gripping the handle so that the trigger 28 is moved towards the full line position in FIG. 2, causing the jaw 30 to move away from the jaw 31 and releasing the hose.

A microswitch 33 is mounted within the handle 27 and has an operating button 34 which is depressed to operate the switch when a trigger 28 is fully compressed to open the jaws. The switch 33 is connected through a cable 35, which extends back to the cream whipping machine along the hose 17 to which it may be located by means of tape or a light outer sleeve. When the button 34 is depressed it causes the pump motor 8 to start and the valve 15 to be opened so that whipped cream is supplied through the hose 17 and the spear. When the trigger 28 is released the motor 8 is stopped and the valve 15 is closed substantially simultaneously with closure of the jaws 30 and 31. This ensures that product under working pressure is maintained at all times in the hose 17.

In practice the operator will hold the spear in his hand and will repeatedly insert the tip 25 of the spear into a closed cake, such as the cake 19, and operate the trigger 28. After a short period of time the trigger will be released and the tip 25 removed for the next operation.

FIG. 3 illustrates a modification in which the hose 17 is again connected to the spear proper 23 by means of a screw-threaded enlargement 22 and a nut 24a. The actuating member and jaws are again mounted on the nut but in this case the actuating member consists of a lever 36 which is intended to be overlaid by the thumb of the operator's hand in which the internally threaded portion or nut 24a is carried between the fingers and palm. The lever 36 is pivoted to the nut 24a at a transverse axis 37 and is formed integrally with an inwardly convex jaw 38. A complementary internally convex jaw 39 is similarly pivoted to the nut 24a at an axis 40. The actuating member 36 is urged to the illustrated outer position by means of a compression spring 41 and in this position the jaws 38 and 39 nip the hose 17 between them to close the entrance to the spear. The reaction of the spring 41 is transmitted to the jaw 39 through engaging hook-like abutments 42 on the two jaws.

To open the jaws the actuating member 36 is depressed towards the spear against the action of the spring 41 causing the jaw 38 to open and allowing the jaw 39 to open as well as the hose expands under the internal pressure.

As before a microswitch 43 having a button 44 operable by the actuating member and connected to the machine motor and solenoid valve by means of a cable 45 may be provided for ensuring simultaneous operation of the machine with opening of the jaws and vice versa.

FIG. 4 illustrates a modification in which the downstream end of the spear body proper 23 may be provided with a resilient valve similar to those described in the earlier specifications. As illustrated the valve consists of a ball 46 which is urged against a seating by means of a compression spring 47 held in position by means of a removable screw-threaded tip 48 in which the outlet apertures are formed.

FIG. 5 illustrates a further modification in which a hood 49 is optionally attached by means of a screw-threaded coupling 50 to the downstream end of the spear body proper 23. The hood is shaped like a conventional star decorating nozzle and has a serrated outlet 51. The hood will be fitted when it is desired to use the spear for depositing conventional star-shaped decorations, rather than for use in filling closed cakes.

I claim:
1. In an apparatus for producing stiff fluent aerated food products, such as whipped cream, including a pump (7) having an inlet (9); a motor (8) for driving the pump; an air intake (13) operatively connected to the pump; a liquid product container (10); means (11) for operatively connecting the container to the pump inlet, whereby in use liquid product and air are simultaneously drawn into the pump; a homogenizer (14) operatively connected to the pump to receive the mixture of liquid product and air and to emulsify the mixture; a flexible hose (17) having one end operatively connected to the homogenizer; and a dispensing device (18) including a hollow spear (23) connected to the other end of the hose; characterized in that:

the hollow spear has an externally threaded portion (22) and, upstream thereof, a tapered portion (21) onto which said other end of the hose is fitted; and the dispensing device has
a hollow body (24) in which said other end of the hose is disposed and including an internally threaded portion (24a) mated with the threaded spear portion (22), and an annular tapering surface (24b) compressing the hose between it and the tapered portion (21),
a pair of jaws (30, 31 or 38, 39) relatively movable between an open position which permits flow of product through the hose, and a closed position in which they nip the hose between them and compress the internal walls of the hose together positively to interrupt the flow of product into the spear,
an actuating member (28 or 36) for controlling movement of the jaws between open and closed positions;
an electrical switch (33 or 43) mounted adjacent the actuating member to be thrown thereby when the jaws are moved to open position; and
means (35 or 45) operatively connecting the switch to the motor (8) to start the pump when the jaws are moved to open position.

2. The combination of claim 1 wherein at least one of the jaws is fixed to the actuating member and they are pivotally mounted about an axis transverse to the spear.

3. The combination of claim 2 including a spring for urging the jaws to closed position.

4. The combination of claim 1 in which the biting parts of the jaws which come together to nip the hose between them have opposed convex faces curved in the longitudinal direction of the hose.

5. The combination of claim 1 including a tubular nozzle and means for releasably coupling it to the downstream end of the spear.

* * * * *